US009492817B2

(12) United States Patent
Armendáriz Herrera et al.

(10) Patent No.: US 9,492,817 B2
(45) Date of Patent: Nov. 15, 2016

(54) PROCESS FOR ALTERING THE PHYSICO-CHEMICAL PROPERTIES OF FAUJASITE Y-TYPE ZEOLITES (75) Inventors: Héctor Armendáriz Herrera, Mexico City (MX); María de Lourdes Alejandra Guzmán Castillo, Mexico City (MX); Francisco Javier Hernández Beltrán, Mexico City (MX); Patricia Pérez Romo, Mexico City (MX); Jaime Sánchez Valente, Mexico City (MX); José Marie Maurice Julien Fripiat, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days.

(21) Appl. No.: 13/697,566

(22) PCT Filed: May 13, 2011

(86) PCT No.: PCT/MX2011/000055
§ 371 (c)(1),
(2), (4) Date: Mar. 20, 2013

(87) PCT Pub. No.: WO2011/142649
PCT Pub. Date: Nov. 17, 2011

(65) Prior Publication Data
US 2013/0171058 A1 Jul. 4, 2013

(30) Foreign Application Priority Data
May 14, 2010 (MX) .................. MX/a/2010/005333

(51) Int. Cl.
*C01B 39/02* (2006.01)
*C01B 39/24* (2006.01)
(Continued)

(52) U.S. Cl.
CPC .............. *B01J 29/084* (2013.01); *B01J 29/80* (2013.01); *B01J 35/109* (2013.01); *B01J 37/10* (2013.01);
(Continued)

(58) Field of Classification Search
CPC ... C01B 37/08; C01B 33/2815; C01B 37/02; C01B 39/026; C01B 39/24; B01J 29/85; B01J 29/06; B01J 29/084; B01J 35/109; B01J 37/10; B01J 2229/22; B01J 2229/40; B01J 2229/60
See application file for complete search history.

(56) References Cited

U.S. PATENT DOCUMENTS 5,059,567 A 10/1991 Linsten et al.
5,456,821 A * 10/1995 Absil et al. .................. 208/114
2010/0065477 A1 3/2010 Wu

OTHER PUBLICATIONS

Castillo et al, Y zeolite depolymerization—recrystallization: Simultaneous formation of hierarchical porosity and Na dislodging, Microporous and Mesoporous Materials 143 (2011) 375-382.*
(Continued)

*Primary Examiner* — David M Brunsman
(74) *Attorney, Agent, or Firm* — Dickinson Wright PLLC (57) ABSTRACT The physical and chemical properties of Faujasite Y-type zeolites (FAU), mainly used as a base material of catalyst used in the Fluid Catalytic Cracking (FCC) process, are modified by contact with a short-chain polyol and mixture with an ammonium salt followed by thermal treatment to produce a modified Faujasite Y-type zeolite with sodium content as low as 75% below that of the starting Faujasite Y-type zeolite. The modified Faujasite Y-type zeolite is dispersed in a mesoporous material having an average pore size ranging from 2 to 100 nm.

18 Claims, 5 Drawing Sheets (51) Int. Cl.
  B01J 29/80    (2006.01)
  B01J 29/08    (2006.01)
  B01J 35/10    (2006.01)
  B01J 37/10    (2006.01)
  C10G 11/05    (2006.01)
  C10G 11/18    (2006.01)
  B01J 29/04    (2006.01)
  B01J 31/02    (2006.01)

(52) U.S. Cl.
  CPC .............. *C01B 39/026* (2013.01); *C01B 39/24* (2013.01); *C10G 11/05* (2013.01); *C10G 11/18* (2013.01); *B01J 29/041* (2013.01); *B01J 31/0202* (2013.01); *B01J 31/0239* (2013.01); *B01J 2229/22* (2013.01); *B01J 2229/34* (2013.01); *B01J 2229/40* (2013.01); *B01J 2229/60* (2013.01); *B01J 2229/62* (2013.01)

(56) References Cited

OTHER PUBLICATIONS

Romo et al, "J Crystallization of faujasite Y from seeds dispersed on mesoporous materials", Microporous and Mesoporous Materials 132 (2010) 363-374.*

Malagon et al, "Local Order in Depolymerized Silicate Lattices", Inorg. Chem. 2005, 44, 8486-8494.*

Guzman-Castillo, M.L. et al., Y-Zeolite depolymerization-recrystallization: Simultaneous formation of hierarchical porosity and Na-dislodging, Microporous and Mesoporous Materials, Mar. 25, 2011 [online], vol. 143, pp. 375-382.

Salman, N. et al., Effect of temperature and time in the hydrothermal treatment of HY zeolite, Microporous and Mesoporous Materials, Nov. 29, 2005 [online], vol. 90, pp. 339-346.

International Search Report for PCT/MX2011/000055, dated Nov. 30, 2011.

Melendez-Ortiz, H. et al., Hydrothermal Synthesis of Mesoporous Silica MCM-41 Using Commercial Sodium Silicate, J. Mex. Chem. Soc. 2013, 57(2), 73-79.

Mokhonoana, M.P. et al., Highly Loaded Fe-MCM-41 Materials: Synthesis and Reducibility Studies, Materials 2009, 2, 2337-2359.

Masika, E. et al., Mesoporous Aluminosilicates from a Zeolite BEA Recipe, Chem. Mater. 2011, 23(9), 2491-2498.

Taguchi, A. et al., Ordered mesoporous materials in catalysis, Microporous and Mesoporous Materials 77 (2005) 1-45.

Kruk, M. et al., Characterization of Highly Ordered MCM-41 Silicas Using X-ray Diffraction and Nitrogen Adsorption, Langmuir 1999, 15, 5279-5284.

Wang, W.J. et al., Hexagonal Mesoporous Silica with Noodle-Like Shape, Journal of Porous Materials 11: 71-78, 2004.

Beck, J.S. et al., A New Family of Mesoporous Molecular Sieves Prepared with Liquid Crystal Templates, J. Am. Chem. Soc. 1992, 114, 10834-10843.

Schneider, P., Adsorption isotherms of microporous-mesoporous solids revisited, Applied Catalysis A: General 129 (1995) 157-165.

Alothman, Z.A., A Review: Fundamental Aspects of Silicate Mesoporous Materials, Materials 2012, 5, 2874-2902.

* cited by examiner

//PROCESS FOR ALTERING THE PHYSICO-CHEMICAL PROPERTIES OF FAUJASITE Y-TYPE ZEOLITES

RELATED APPLICATIONS

This application claims the benefit and priority to Mexican application No. MX/a/2010/0055333 with a filing date of May 14, 2010. This application also claims the benefit and priority to the PCT application, International Publication Number is WO 2011/142649A2, with a filing date of Nov. 17, 2011 the disclosure of which is incorporated herein by reference in its entirely.

FIELD OF THE INVENTION

The present invention relates to a process for modifying the physical and chemical properties of Faujasite Y-type zeolites (FAU), mainly used as a base material of catalyst used in the Fluid Catalytic Cracking (FCC) process, of interest to the oil refining industry for conversion of heavy oil fractions into lighter fractions having a higher commercial value.

More specifically the present invention relates to a process for producing in a single stage:
a) A modified Faujasite Y-type zeolite, with a lower sodium content, as low as 75% below that of the starting Faujasite Y-type zeolite.
b) A mesoporous material having an average pore size ranging from 2 to 100 nm is associated with the modified Faujasite Y-type zeolite, which has a porosity below 1 nm; such materials resulting in a product having a bimodal or multimodal pore size distribution. The proportion of modified Faujasite Y-type zeolite with respect to the meso-porous material associated with the Faujasite Y-type Zeolite, can be adjusted by means of the process operation conditions.

BACKGROUND OF THE INVENTION

Zeolites are materials composed by silicum oxide and oxides of other elements commonly aluminum, that are characterized by their high specific surface areas, high microporosity (pores <2 nm) and capacity to undergo cation exchange; moreover, they present structures that are composed by $TO_4$ (T=Si or Al) tetrahedra that ensemble together to form chains and rings that finally generate tridimensional structures conforming intracrystallines spaces and pores and produce voids and channels at the molecular dimension, commonly in the order of 0.4 to 12 nm. Different possible arrays generate a great number of tridimensional structures possessing individual characteristics Zeolites have a variety of applications such as catalysts and adsorbents. They are materials found in nature, but those prepared synthetically have a higher number of commercial applications.

Zeolites containing silica and aluminum are the most common. The presence of aluminum with tetrahedral coordination generates an excess of negative charge in the structure, which is neutralized by the presence of cations (called compensation cations) commonly alkyl or alkyl earth cations, which are interchangeable.

Among the zeolites with higher commercial interest, Faujasite Y-type structures stress out. These zeolites present a cubic crystalline structure identified by solids X Rays Diffraction (Joint Committee on Powder Diffraction Standards, JCPDS Card 12 0246). They characterize for presenting a pore size 0.74 nm tridimensional system, with specific area values above 700 $m^2/g$ (Langmuir method), determined by means of 77 K Nitrogen adsorption.

The Faujasite Y-type zeolites are mainly used as base material for catalysts for the FCC process (Fluid Catalytic Cracking) of interest to the oil refining industry, whereby crude oil heavy fractions are converted into lighter fractions of high commercial value (gasoline and LP gas, for example). The FCC process is characterized by operating at high temperature conditions (up to 750° C. in the stage of catalyst regeneration) in the presence of water steam and metals under drastic thermal changes, thus requiring the zeolite to have acidic properties and stability under such conditions.

The way Faujasite Y-type zeolites are synthesized at present produces materials that are not suitable as catalysts and consequently, they have to be modified; one of the first modifications to be performed is to eliminate sodium in order to provide acid properties.

Though well dominated in the state of art, the different treatments for modifying the Faujasite Y-type zeolites to be used as catalysts in the FCC process include successive washing stages with ammonia solutions and thermal treatment at high temperatures.

Similarly, the dealumination of the zeolite structure with the aim of increasing zeolite stability is carried out by means of thermal, hydrothermal and controlled chemical treatments, generally conducted in several stages. Besides aluminum extraction, these treatments frequently produce partial destruction of the crystalline structure thus reducing the intracrystalline zeolite area, producing amorphous materials and an increase of the material average pore size towards the mesoporous region. It is frequently important to be able to control meso-porosity of the FCC catalyst, as this enhances molecule conversion from higher size hydrocarbons contained in the oil heavy fractions. This is collaterally produced in the stabilization treatments but also takes place through the incorporation of other materials, not related to the catalyst structure, frequently alumina or amorphous alumino-silicates.

Consequently, since zeolite modification treatments mean successive operations resulting into high manufacturing costs, their simplification is highly desirable.

Because of the above, there is a great interest for finding more efficient and economical processes and/or methods for obtaining zeolites with more suitable properties for use as catalysts.

U.S. Pat. No. 6,054,113 (A), issued on Apr. 25, 2000, discloses a method to prepare Faujasite Y-type zeolites with high silica content through a cationic interchange treatment with ammonia and mineral acid ions and a water steam calcination treatment.

Also, U.S. Pat. No. 5,601,798 (A), issued on Feb. 11, 1997, discloses a process to prepare a Y-type zeolite with a 2 to 60 nm mesoporous volume from combining hydrothermal and chemical treatments.

U.S. Patent Publication No. 2008/014140 (A1), published on Jan. 17, 2008, discloses a manufacturing method for zeolites showing different porous systems, by means of the decomposition by calcination or combustion of carbohydrates such as sucrose previously soaked in zeolites.

U.S. Patent Publication No. 2007/0227351 (A1), published on Oct. 4, 2007, discloses the synthesis of meso-structured zeolites from a preformed zeolite, treated in a media using ammonia salts or alkyl ammonia, mineral acids such as fluorohydric acid and surfactants followed by hydrothermal treatments in autoclave.

The former technologies, known by the applicant, were improved by means of the process of the present invention, as it produces in one stage a modified Faujasite Y-type Zeolite and a mesoporous material associated to the Faujasite Y-type Zeolite, where the sodium content of the modified Faujasite Y-type zeolite is lower with respect to that in the pristine Faujasite Y-type Zeolite.

Therefore, one of the aims of the present invention is to supply a process for modifying the physical and chemical properties of Faujasite Y-type Zeolites, carrying out in one stage and jointly the sodium content modification and producing a meso-porous material that modifies the Langmuir total specific area, the micro-pore area, the pore volume and the pore size distribution of the pristine Faujasite Y-type Zeolite.

An additional purpose of the present invention is to supply a process to produce a modified Faujasite Y-type Zeolite, with a sodium content up to a 75% lower than that of the pristine Faujasite Y-type Zeolite and a mesoporous material, associated to the modified Faujasite Y-type Zeolite, presenting a pore average size from 2 to 100 nm.

One more purpose for the present invention is to supply a process for producing materials presenting a bimodal or polymodal pore distribution, and where the modified Faujasite Y-type Zeolite proportion, regarding the mesoporous material associated to the modified Faujasite Y-type Zeolite, can be regulated through the process operation conditions.

SUMMARY OF THE INVENTION

The process of the present invention involves a method of modifying the physical and chemical properties of Faujasite Y-type zeolites, comprising:
a) contacting a Faujasite Y-type zeolite, with a short chain polyol, preferably glycerol, in a concentration ranging from 0.01 to 1 g of solid per milliliter of glycerol, at a temperature ranging from 100 to 260° C., for a time from 0.5 to 8 hours, to form a gel;
b) adding one or more ammonium salts to the gel to form a mixture, stirring the mixture for 15 to 60 min., subjecting the mixture to hydrothermal treatment at 95-250° C., for from 5 to 40 hours, cooling the mixture to 15 to 25° C.; and c) recovering a solid by means of filtration and/or centrifugation, washing the solid with water, preferably bidistilled water, and drying at 80-120° C. to obtain a dried solid, then submitting the dried solid to a thermal treatment at 350 to 550° C., for 2 to 8 hours to obtain a product comprising a modified Faujasite Y-type zeolite on a mesoporous material having an average pore size ranging from 2 to 100 nm, wherein the sodium content of the modified Faujasite Y-type zeolite is as low as 75% below that of the Faujasite Y-type zeolite in step a) prior to contact with the glycerol.

Likewise, the present invention involves a process for modifying the physical and chemical properties of Faujasite Y-type zeolites, comprising:
a) contacting a Faujasite Y-type zeolite, with glycerol, in a concentration ranging from 0.01 to 1 g of solid per milliliter of glycerol, at a temperature ranging from 100 to 260° C., for a time from 0.5 to 8 hours, to form a gel;
b) adding one or more ammonium salts to the gel to form a mixture, stirring the mixture for 15 to 60 min., subjecting the mixture to hydrothermal treatment at 95-250° C., for from 5 to 40 hours, cooling the mixture to 15 to 25° C.; and
c) recovering a solid by means of filtration and/or centrifugation, washing the solid with water and drying at 80-120° C. to obtain a dried solid, then subjecting the dried solid to a thermal treatment at 350 to 550° C. for 2 to 8 hours at a heating rate from 1 to 3° C./min.

DETAILED DESCRIPTION OF THE INVENTION

The present invention relates to a process for modifying the physical and chemical properties of Faujasite Y-type zeolites (FAU), mainly used as an active material of the catalyst for the Fluid Catalytic Cracking (FCC) process, widely used in the oil refining industry, for conversion of oil heavy fractions into lighter fractions having a higher commercial value.

More specifically the present invention relates to a process for producing in a single stage:
a) A modified Faujasite Y-type zeolite, with a lower sodium content, as low as 75% below that of the starting Faujasite Y-type zeolite.
b) A mesoporous material having an average pore size ranging from 2 to 100 nm associated with the modified Faujasite Y-type zeolite, which has a porosity below 1 nm; such produced materials present a bimodal or multimodal pore size distribution. The proportion of modified Faujasite Y-type zeolite with respect to the meso-porous material associated to the Faujasite Y-type Zeolite, can be regulated through the process operation conditions.

The process of the present invention comprises: a) contacting a sodium Faujasite Y-type zeolite, which can be in a pure or pristine form or in a mixture with other materials, with a short-chain polyol, preferably glycerol, in a concentration ranging from 0.01 to 1 g of solid per milliliter of glycerol, at a temperature ranging from 100 to 260° C., preferably from 180 to 200° C., for a period of from 0.5 to 8 hours, preferably from 1.5 to 2 hours to form a gel; b) adding, an ammonium salt and/or a mixture of ammonium salts, which can be added in powder form and/or in an aqueous and/or an alcoholic solution, in a ratio of from 0.01 to 3 g of salt per gram of solid, at a temperature from 20 to 80° C., preferably from 40 to 60° C., and/or with structure directing agents, stirring the mixture for a period of time from 15 to 60 min., preferably from 25 to 30 minutes. Then the mixture is subject to hydrothermal treatment at 95-220°

C., preferably ranging from 140 to 180° C., for from 5 to 40 hours, preferably from 10 to 20 hours, afterwards the mixture is cooled to room temperature and; c) recovering product obtained in b) by means of filtration and/or centrifugation techniques, washing with bidistilled water and drying at 80-120° C., preferably from 90-110° C. Then the solid is thermally treated at a temperatures ranging from 350 to 550° C., preferably from 480 to 520° C., for a time ranging from 2 to 8 hours, preferably from 3 to 5 hours, at a heating rate from 1 to 3° C./min, to obtain a modified Faujasite Y-type zeolite highly dispersed on the in-situ made mesoporous material.

The ammonium salts used in stage b) can be a nitrate, chloride, acetate, sulfate, and/or an organic quaternary ammonium salt; while the ammonium salts incorporated in aqueous and/or alcoholic solutions, are selected from ammonium nitrate, tetramethyl ammonium bromide, and/or cetyl-trimethyl ammonium bromide.

The process of the present invention is distinctive because in one stage the sodium can be removed up to a 75% with respect to the starting Faujasite Y-type zeolite, which may be pristine Faujasite Y-type zeolite; concomitantly, this treatment of the present invention produces a mesoporous material having an average pore size from 2 to 100 nm, with a zeolite content from 5-100% and displaying a bimodal pore distribution, due to a porosity lower than 1 nm inherent in the zeolite together with a porosity in the mesoporous region from 2-100 nm inherent in the mesoporous material, more specifically a pore system in the region from 2-20 nm and a second pore system in the region from 30 a 100 nm, where the proportion of the modified Faujasite Y-type Zeolite with respect to the mesoporous material associated to the modified Faujasite Y-type Zeolite, can be regulated by means of the process operation conditions.

EXAMPLES

Once the basic aspects related to the present invention have been described a series of examples are offered to illustrate specific embodiments; notwithstanding, the invention should not be considered to be limited to said. Room temperature is defined herein after as temperature ranging from 10 and 30° C.

Example 1

A sample of the Faujasite Y-type zeolite, identified as F1-IMP, was analyzed by means of atomic absorption spectroscopy, obtaining the following chemical composition:
Sodium as Na: 8.7 weight %
Si/Al atomic ratio: 2.35

Example 2

Figure 1:
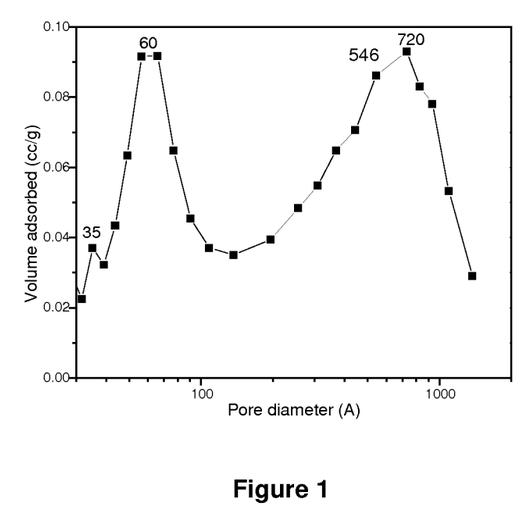
FIG. 1 shows the pore size distribution of the pristine Faujasite Y-type zeolite, identified as F1-IMP.

The F1-IMP zeolite sample from Example 1 was studied by means of nitrogen adsorption at 77 K to determine its specific surface area by the Langmuir method (ASTM D3663-03 Method), and its micropore surface area, calculated by the t-plot method (ASTM D4365-95 Method), while the following results were obtained:
Total Langmuir specific area: 944 m$^2$/g
t-plot micropore area: 890 m$^2$/g
External area: 54 m$^2$/g Given that micropore surface area is related to the intra-crystalline area of the zeolite, the difference between Langmuir and t-plot values (54 m$^2$/g) represents the external area, in this case related to the external area of the F1-IMP zeolite crystals. The pore size distribution of the F1-IMP zeolite is shown in FIG. 1.

Example 3

2 g F1-IMP zeolite from Examples 1 and 2 were placed in a glass vessel with 20 ml of glycerol and heating at 200° C. for 2 hours, obtaining a gel which was transferred to a 50 ml autoclave, adding 0.00835 moles of cetyl-trimethyl ammonium bromide (CETAB) dissolved in 1.67 moles of water, and then stirred at ambient temperature for 30 minutes; lately, the autoclave was sealed and heated at 150° C. for 15 hours. Finally, the autoclave and its content were cooled down and once at room temperature the solid was recovered by filtering, washed with bidistilled water and dried at 100° C. in a stove. The solid was recovered and identified as MM-Z-34-SC.

Example 4

The MM-Z-34-SC solid, obtained in Example 3, was submitted to a thermal treatment in static atmosphere in a muffle at 500° C. for 4 hours, heating from room temperature at 1° C./min rate. The solid obtained from the thermal treatment was identified as MMZ-34C.

Example 5

Figure 2:
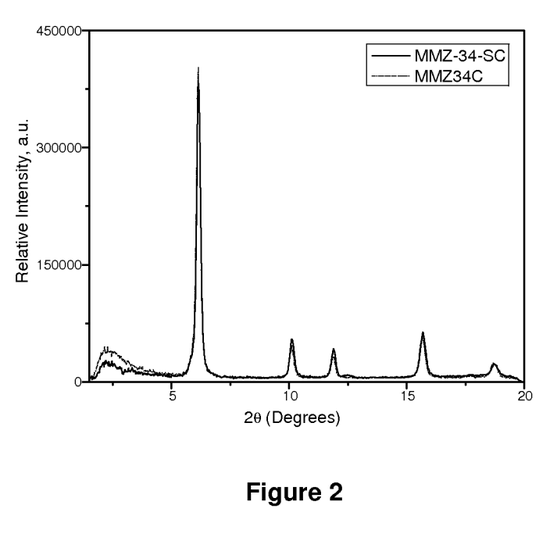
FIG. 2 shows the X-ray diffraction patterns of the modified zeolites identified as MMZ-34-SC and MMZ-34C.

The MM-Z-34-SC and MMZ-34C solids, obtained from Examples 3 and 4 respectively, were characterized by X-ray powder diffraction, obtaining the diffraction patterns presented in FIG. 2, leading to identify crystalline structures corresponding to a Faujasite Y-type zeolite, according to JCPDS card 12 0246 reference. The wide peak observed at 2θ values <2.5° indicates the presence of a mesoporous material.

Example 6

The MMZ-34C solid, obtained in Example 4, was studied by means of nitrogen adsorption at 77 K, with the purpose of determining its total specific area from the Langmuir method (ASTM D3663-03 Method), its total pore volume by the BJH method (ASTM D4641-94 Method) and its micropores area calculated from the t-plot method (ASTM D4365-95 Method), while obtaining the following results:
Langmuir total specific area: 856 m$^2$/g
t-plot micropore area: 742 m$^2$/g
Total pore volume: 0.467 cm$^3$/g
External area: 114 m$^2$/g Comparing these textural results with those obtained for the pristine F1-IMP zeolite from Examples 1 and 2, MMZ-34C shows a decrease in the Langmuir specific surface area by 88 m$^2$/g and by 148 m$^2$/g in the micropore surface area. The increase of the external surface area by 60 m$^2$/g is attributable to the presence of the mesoporous material. From the micropore area values, the amount of zeolite with respect to the total amount of material produced was equivalent to 83%.

Figure 3:
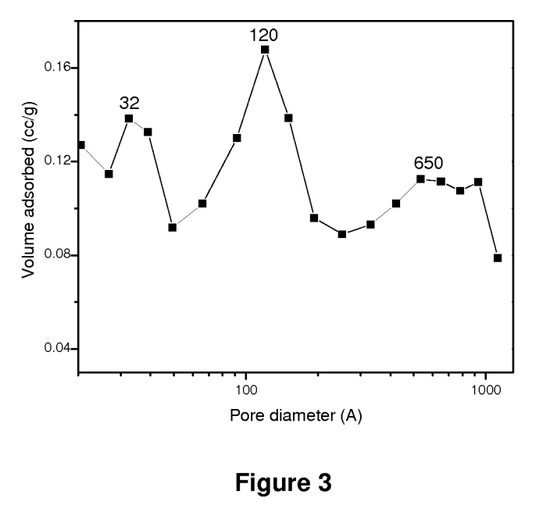
FIG. 3 shows the pore size distribution of the zeolite identified as MMZ-34C.

The pore size distribution of the mesoporous material in the MMZ-34C sample, FIG. 3, presents a trimodal pore size distribution with maximums at 32 Å (3.2 nm), 120 Å (12 nm) and 650 Å (65 nm).

Example 7

The chemical composition of MMZ-34C solid, obtained in Example 4, and studied in Examples 5 and 6, was analyzed by means of the atomic adsorption spectroscopy, obtaining the following results:
Sodium as Na: 8% weight
Si/Al atomic ratio: 2.20

These results show that comparing with the pristine F1-IMP zeolite (Example 1), the MMZ-34C modified Faujasite Y-type zeolite presents a decrease in the sodium content equivalent to 8%.

Example 8

2 g of F1-IMP zeolite of Examples 1 and 2 were placed in a glass vessel with 20 ml of glycerol, and heating at 180° C. for 2 hours, obtaining a gel which was transferred to a 50 ml autoclave, adding 0.030 moles of powdered ammonium nitrate, equivalent to 1.14 grams of ammonium nitrate per gram of zeolite, at 40° C., then stirred for 19 hours at room temperature. Afterwards, 1.11 moles of distilled water were added, the autoclave was hermetically sealed, and heated at 150° C. for 15 hours. Finally, the autoclave and its content were cooled down to room temperature, the solid was recovered by filtering, washed with distilled water and dried at 100° C. in a stove. The solid was recovered as powder and identified as MM-Z-54-SC.

Example 9

The MM-Z-54-SC solid, obtained in Example 8, was submitted to a thermal treatment in air static atmosphere in a muffle at 500° C. for 4 hours, heating from room temperature at 1° C./min rate. The solid obtained from the thermal treatment was identified as MMZ-54C.

Example 10

Figure 4:
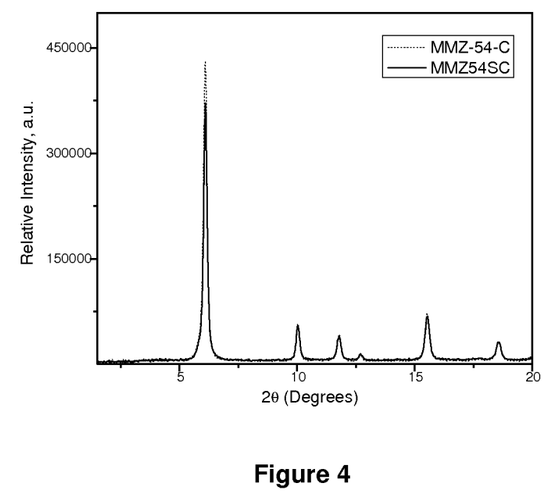
FIG. 4 shows the X-ray diffraction patterns of the modified zeolites identified as MMZ-54-SC and MMZ-54C.

The MM-Z-54-SC and MMZ-54C solids, obtained from Examples 8 and 9 respectively, were characterized by X-ray powder diffraction, obtaining the diffraction patterns presented in FIG. 4, leading to identify one crystalline structure corresponding to a Faujasite Y-type zeolite, according to the JCPDS Card 12 0246 reference.

Example 11

The MMZ-54C solid, obtained in Example 9, was studied by means of nitrogen adsorption-desorption isotherms at 77 K, with the purpose of determining its total surface area, calculated from the Langmuir method (ASTM D3663-03 method), its total pore volume from the BJH method (ASTM D4641-94 method), its micropores area, calculated from the t-plot method (ASTM D4365-95 method), while obtaining the following results:
Langmuir total specific area: 899 $m^2/g$
t-plot micropore area: 825 $m^2/g$
Total pore volume: 0.428 $cm^3/g$
External area: 74 $m^2/g$ Comparing these textural results with those obtained for the pristine F1-IMP zeolite of Examples 1 and 2, MMZ-54C shows a decrease in the Langmuir specific surface area by 45 $m^2/g$ and in the micropores by 65 $m^2/g$. The increase by 20 $m^2/g$ in the external area of MMZ-54C solid is attributable to the presence of mesoporous material. From these micropores area data, the amount of zeolite in the total material was equivalent to 93%.

Figure 5:
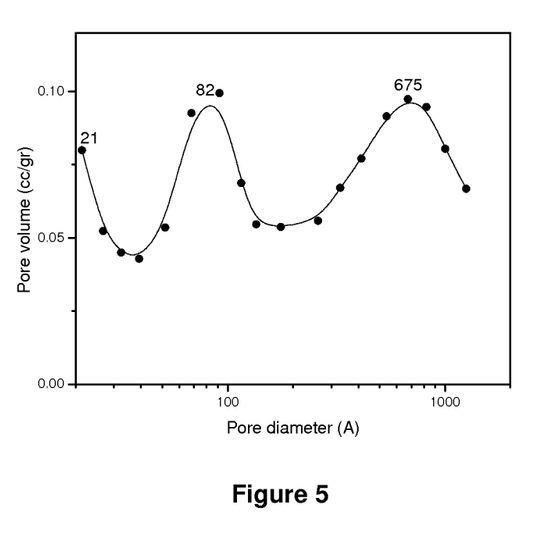
FIG. 5 shows the pore size distribution of the modified zeolite labeled as MMZ-54C.

The pore size distribution of the mesoporous material in the MMZ-54C solid, which is illustrated in FIG. 5, presents a bimodal pore size distribution of 82 Å (8.2 nm) and 675 Å (67.5 nm).

Example 12

The chemical composition of the MMZ-54C solid, obtained in Example 9 and studied in Examples 10 and 11, was analyzed by means of atomic absorption spectroscopy, obtaining the following results:
Sodium as Na: 3.3% by weight
Si/Al atomic ratio: 1.75

These results show that comparing with those of the pristine F1-IMP zeolite (Example 1), the MMZ-54C modified Faujasite Y-type zeolite presents a decrease in the sodium content equivalent to 62%.

Example 13

2 g of the F1-IMP zeolite of Examples 1 and 2 were placed in a glass vessel with 20 ml of glycerol, and heating at 180° C. for 2 hours, obtaining a gel which was transferred to a 50 ml autoclave, adding 0.017 moles of ammonium nitrate dissolved in 0.25 moles of methanol, equivalent to 0.646 g of ammonium nitrate per gram of zeolite, at 40° C., then aged for 19 h at room temperature. Afterwards, the autoclave was hermetically sealed and heated at 150° C. for 15 hours. Finally the autoclave and its content were cooled down and once at room temperature the solid was recovered by filtering, dried at 110° C. for 2 hours, and submitted to a thermal treatment in air static atmosphere in a muffle at 500° C. for 4 hours. The solid obtained was identified as MMZ-51C.

Example 14

Figure 6:
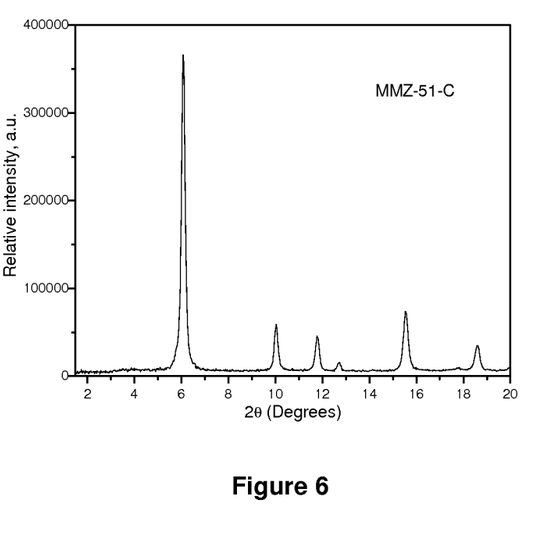
FIG. 6 shows the X-ray diffraction pattern of the modified zeolite labeled as MMZ-51C.

The MMZ-51C solid, obtained from Example 13, was characterized by X-ray powder diffraction, obtaining the diffraction pattern presented in FIG. 6, leading to identify a crystalline structure corresponding to a Faujasite Y-type zeolite, according to the JCPDS Card 12 0246 reference.

Example 15

The MMZ-51C solid, obtained in Example 13, was studied by mean of nitrogen adsorption-desorption isotherms at 77 K, with the purpose of determining its total surface area, calculated from the Langmuir method (ASTM D3663-03 method), its total pore volume from the BJH method (ASTM D4641-94 method), its micropores area, calculated from the t-plot method (ASTM D4365-95 method), while obtaining the following results:
Langmuir total specific area: 865 $m^2/g$
t-plot micropore area: 765 $m^2/g$
Total pore volume: 0.460 $cm^3/g$
External area: 100 $m^2/g$ From these micropores area data, the amount of zeolite in the total material was equivalent to 86%

Figure 7:
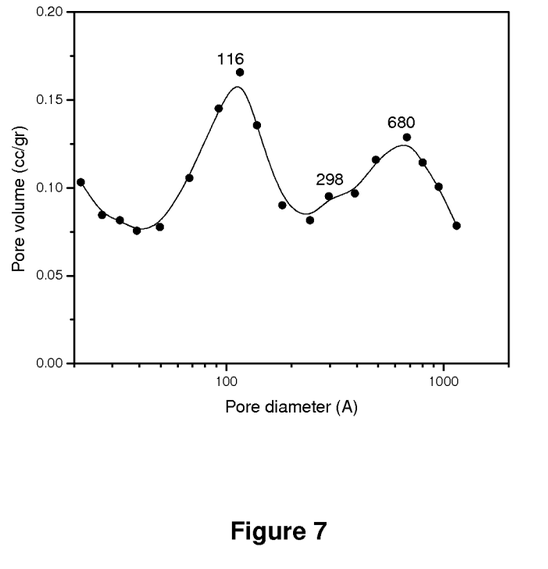
FIG. 7 shows the pore size distribution of the modified zeolite labeled as MMZ-51C.

The pore size distribution of the mesoporous material in the MMZ-51C sample shown in FIG. 7, presents a bimodal pore size distribution at 116 Å (11.6 nm) and 680 Å (68 nm).

Example 16

The chemical composition of the MMZ-51C solid, obtained in Example 13 and studied in Examples 14 and 15 was analyzed by means of atomic adsorption spectroscopy, obtaining the following results:
Sodium as Na: 3.5% by weight
Si/Al atomic ratio: 2.85

These results show that comparing with the pristine F1-IMP zeolite (Example 1), the modified Faujasite Y-type zeolite presents a decrease in the sodium content, equivalent to 59.8%.

Example 17

A sample of the Faujasite Y-type zeolite, identified as F2-G, was analyzed by means of atomic adsorption spectroscopy, obtaining the following chemical composition:
Sodium as Na: 7.15% by weight
Si/Al atomic ratio: 2.57

Example 18

The F2-G zeolite sample from Example 17 was studied by means of nitrogen adsorption-desorption isotherms at 77 K, with the purpose of determining its total surface area, calculated from the Langmuir method (ASTM D3663-03 method), its total pore volume from the BJH method (ASTM D4641-94 method), its micropores area, calculated from the t-plot method (ASTM D4365-95 method), while obtaining the following results:
Langmuir total specific area: 903 m$^2$/g
t-plot micropore area: 857 m$^2$/g
Total pore volume: 0.359 cm$^3$/g
Average pore diameter: <3 nm
External area: 46 m$^2$/g Since the micropore surface area is related to the intra-crystalline area of the zeolite, the difference between Langmuir and t-plot values (46 m$^2$/g) represents the external area.

Figure 8:
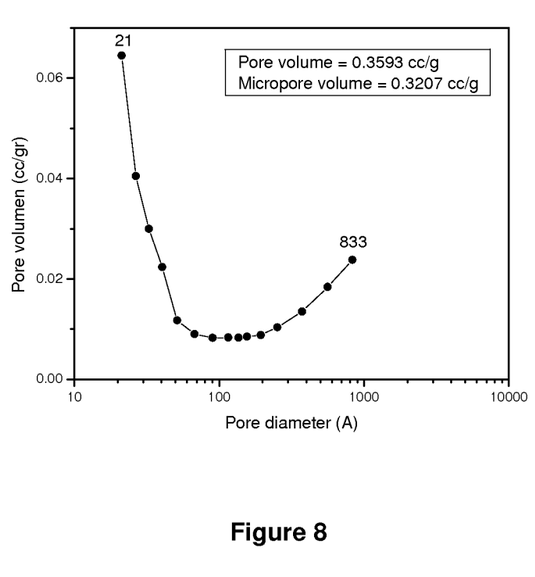
FIG. 8 shows the pore size distribution of the Faujasite Y-type zeolite, labeled as F2-G.

The pore size distribution of the F2-G zeolite is shown in FIG. 8.

From the total specific area and micropores area data, the amount of zeolite in the total material was equivalent to 94.9%.

Example 19

2 g of the F2-G zeolites of Examples 17 and 18, were placed in a glass vessel with 20 ml glycerol, and heating at 250° C. for 2 hours, obtaining a gel. The reaction mixture was transferred to a 50 ml autoclave, adding 0.030 moles of powdered ammonium nitrate, equivalent to 1.14 grams of ammonium nitrate per zeolite gram, at a 40° C., then cooled down and stirred for 19 hours at room temperature. Afterwards, 1.11 moles of distilled water were added, the autoclave was hermetically sealed, and heated at 150° C. for 15 hours. Once cooled the resulting product was recovered by filtering, washed and dried at 100° C. The obtained solid was identified as MMZ-68-SC.

Example 20

The MMZ-68-SC solid, obtained in Example 19, was submitted to a thermal treatment in static air atmosphere at 500° C. muffle for 4 hours, heating from room temperature at 1° C./min rate. The solid obtained from the thermal treatment was identified as MMZ-68C.

Example 21

Figure 9:
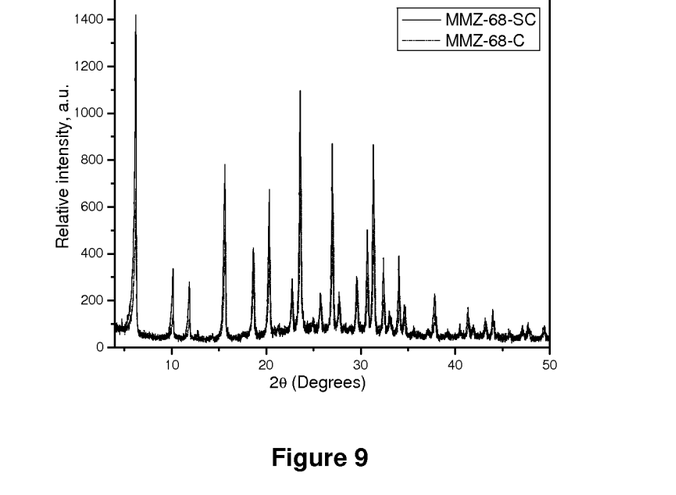
FIG. 9 shows the X-ray diffraction pattern of the modified zeolites identified as MMZ-68-SC and MMZ-68C.

The MMZ-68-SC and MMZ-68C solids, obtained from Examples 19 and 20 respectively were characterized by X-ray powder diffraction, obtaining the diffraction patterns shown in FIG. 9, leading to identify the crystalline structure corresponding to a Faujasite Y-type zeolite, according to the JCPDS Card 12 0246 reference.

Example 22

Figure 10:
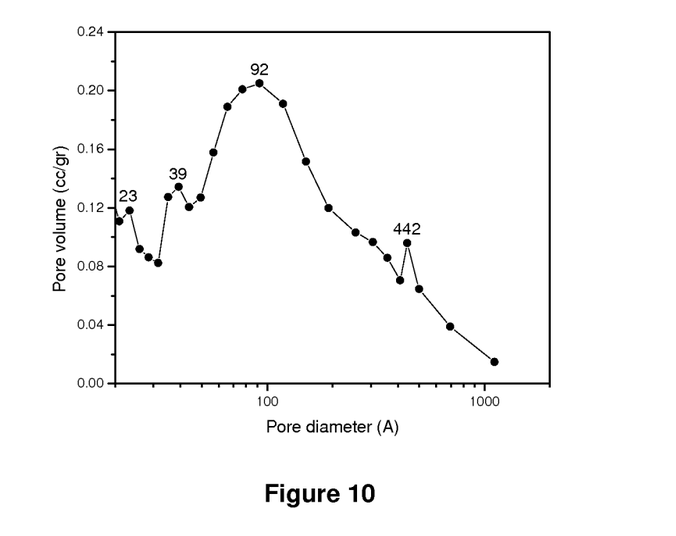
FIG. 10 shows the pore size distribution of the modified zeolite identified as MMZ-68C.

The MMZ-68C solid, obtained in Example 20, was studied by means of nitrogen adsorption-desorption isotherms at 77 K, with the purpose of determining its total surface area, calculated from the Langmuir method (ASTM D3663-03 method), its total pore volume from the BJH method (ASTM D4641-94 method), its micropores area, calculated from the t-plot method (ASTM D4365-95 method), while obtaining the following results:
Langmuir total specific area: 692 m$^2$/g
t-plot micropore area: 578 m$^2$/g
Total pore volume: 0.427 cm$^3$/g
External area: 114 m$^2$/g Comparing these textural results with those obtained for the pristine F2-G zeolite (Example 18), it can be observed a decrease in the Langmuir specific surface area by 211 m$^2$/g and in the micropore surface area by 279 m$^2$/g and the increase in the external area (68 m$^2$/g) which is attributable to the presence of mesoporous material, which agrees with the pore size distribution presented in FIG. 10. From the micropore area data, the amount of zeolite with respect to the total amount of the material was equivalent to 67%.

Since the micropore surface area is related to the intra-crystalline area of the zeolite, the difference between Langmuir and t-plot values Based on the fact that micropores area is related to the amount of zeolite in the material, MMZ-68C contains 33% lower than the pristine F2-G solid.

Example 23

The chemical composition of MMZ-68C solid, obtained in Example 20 and studied in Examples 21 and 22 was analyzed by means of an atomic adsorption spectroscopy, obtaining the following results:
Sodium as Na: 1.85% by weight
Si/Al atomic ratio: 2.64

These results show that comparing with those of the pristine F2-G zeolite, (Example 17) the MMZ-68C modified Faujasite Y-type zeolite presents a decrease in the sodium content equal to 74%.

What is claimed is:

1. A process for modifying the physical and chemical properties of Faujasite Y-type zeolites, comprising:
   a) contacting a Faujasite Y-type zeolite, with glycerol, in a concentration ranging from 0.01 to 1 g of solid per milliliter of glycerol, at a temperature ranging from 100 to 260° C., for a time from 0.5 to 8 hours, to form a gel;
   b) adding one or more ammonium salts to the gel to form a mixture, stirring the mixture for 15 to 60 min., subjecting the mixture to hydrothermal treatment at 95-250° C., for from 5 to 40 hours, cooling the mixture to 15 to 25° C.; and
   c) recovering a product obtained in step (b) by means of filtration and/or centrifugation, washing the solid with water and drying at 80-120° C. to obtain a dried solid, then subjecting the dried solid to a thermal treatment at 350 to 550° C. for 2 to 8 hours at a heating rate from 1 to 3° C./min, to obtain a modified Faujasite Y-type zeolite where the sodium content is reduced up to 75% with respect to the Faujasite Y-type zeolite of step (a)

along with a mesoporous material made in situ having an average pore size ranging from 2 to 100 nm.

2. The process of claim 1, wherein the temperature used in stage a) ranges from 180 to 200° C., for from 1.5 to 2 hours.

3. The process of claim 1, wherein the ammonium salt used in stage b) is selected from the group consisting of a nitrate, chloride, acetate, sulfate, and an organic quaternary ammonium salt.

4. The process of claim 1, wherein the ammonium salt in stage b) is selected from the group consisting of tetra-methyl ammonium bromide, cetyl-trimethyl ammonium bromide and ammonium nitrate.

5. The process of claim 1, wherein the ammonium salt used in stage b) is added in a ratio of 0.01 to 3 grams of salt per gram of zeolite.

6. The process of claim 1, wherein the addition of ammonium salt used in stage b) is carried out at a temperature ranging from 40 to 60° C.

7. The process of claim 1, wherein the mixture is stirred in stage b) from 25 to 30 minutes.

8. The process of claim 1, wherein the hydrothermal treatment in stage b) is conducted under autogenous pressure at a temperature from 140 to 180° C. for 10 to 20 hours.

9. The process of claim 1, wherein drying in stage c) is carried out at a temperature in the range of 90 to 110° C.

10. The process of claim 1, wherein the thermal treatment in stage c) is carried out at a temperature from 480-520° C. for 3 to 5 hours.

11. A process for modifying the physical and chemical properties of Faujasite Y-type zeolites, comprising:
   a) contacting a Faujasite Y-type zeolite, with glycerol, in a concentration ranging from 0.01 to 1 g of solid per milliliter of glycerol, at a temperature ranging from 100 to 260° C., for a time from 0.5 to 8 hours, to form a gel;
   b) adding one or more ammonium salts to the gel to form a mixture, stirring the mixture for 15 to 60 min., subjecting the mixture to hydrothermal treatment at 95-250° C., for from 5 to 40 hours, cooling the mixture to 15 to 25° C.; and
   c) recovering a product obtained in step (b) by means of filtration and/or centrifugation, washing the product with water and drying at 80-120° C. to obtain a dried solid, then subjecting the dried solid to a thermal treatment at 350 to 550° C. for 2 to 8 hours at a heating rate from 1 to 3° C./min.

12. The process of claim 11, wherein the temperature used in stage a) ranges from 180 to 200° C., for from 1.5 to 2 hours.

13. The process of claim 11, wherein the ammonium salt used in stage b) is selected from the group consisting of a nitrate, chloride, acetate, sulfate, and an organic quaternary ammonium salt.

14. The process of claim 11, wherein the ammonium salt in stage b) is selected from the group consisting of tetra-methyl ammonium bromide, cetyl-trimethyl ammonium bromide and ammonium nitrate.

15. The process of claim 11, wherein the ammonium salt used in stage b) is added in a ratio of 0.01 to 3 grams of salt per gram of zeolite.

16. The process of claim 11, wherein the addition of ammonium salt used in stage b) is carried out at a temperature ranging from 40 to 60° C.

17. The process of claim 11, wherein the mixture is stirred in stage b) from 25 to 30 minutes.

18. The process of claim 11, wherein the hydrothermal treatment in stage b) is conducted under autogenous pressure at a temperature from 140 to 180° C. for 10 to 20 hours.

* * * * *